(12) United States Patent
Ramasundaram et al.

(10) Patent No.: US 11,611,815 B2
(45) Date of Patent: Mar. 21, 2023

(54) RAILCAR SENSOR COMMUNICATION SYSTEM

(71) Applicant: FreightLucid, LLC, Dallas, TX (US)

(72) Inventors: Bharanikumar Ramasundaram, Flower Mound, TX (US); James W. Talley, Jr., Frisco, TX (US); Michael D. Rainone, Palestine, TX (US); Samuel A. Sackett, Frankston, TX (US); Taylor Z. Ramirez, Tyler, TX (US); Calvin Schlau, Winona, TX (US); Caleb N. Nehls, Tyler, TX (US); Miles H. Scott, Richmond, TX (US)

(73) Assignee: FREIGHTLUCID, LLC, Dallas, TX (US)

( * ) Notice: Subject to any disclaimer, the term of this patent is extended or adjusted under 35 U.S.C. 154(b) by 0 days.

(21) Appl. No.: 17/023,540

(22) Filed: Sep. 17, 2020

(65) Prior Publication Data
US 2021/0084393 A1    Mar. 18, 2021

Related U.S. Application Data

(60) Provisional application No. 62/901,423, filed on Sep. 17, 2019.

(51) Int. Cl.
*H04Q 9/00*        (2006.01)
*B61L 15/00*       (2006.01)
*G16Y 20/10*       (2020.01)

(52) U.S. Cl.
CPC ............ *H04Q 9/00* (2013.01); *B61L 15/0063* (2013.01); *B61L 15/0072* (2013.01); *G16Y 20/10* (2020.01); *H04Q 2209/43* (2013.01)

(58) Field of Classification Search
CPC .. H04Q 9/00; H04Q 2209/43; B61L 15/0063; B61L 15/0072; G16Y 20/10
See application file for complete search history.

(56) References Cited

U.S. PATENT DOCUMENTS 7,199,488 B1    4/2007  Baker
7,688,218 B2    3/2010  LeFebvre et al.
(Continued)

FOREIGN PATENT DOCUMENTS

JP    2009-077392 A    4/2009
JP      59913696 B2    9/2016
(Continued)

OTHER PUBLICATIONS

International Search Report and Written Opinion of PCT Patent Application No. PCT/US2020/051178, dated Jan. 5, 2021; 9 pages.

*Primary Examiner* — Amine Benlagsir
(74) *Attorney, Agent, or Firm* — Baker Botts L.L.P.

(57) ABSTRACT

According to some embodiments, a railcar monitoring system for monitoring one or more conditions associated with a railcar comprises a railcar controller and one or more sensors disposed throughout the railcar and communicably coupled to the railcar controller. The railcar controller is configured to exchange data with the one or more sensors and transmit data from the one or more sensors to a remote location. An amount of data exchanged between the railcar controller and the one or more sensors is controlled based on a railcar context. The railcar context is based on a location and/or activity associated with the railcar.

15 Claims, 5 Drawing Sheets

(56) References Cited

U.S. PATENT DOCUMENTS

| | | | |
|---|---|---|---|
| 8,060,264 | B2 | 11/2011 | Oestermeyer et al. |
| 8,212,685 | B2 | 7/2012 | LeFebvre et al. |
| 8,244,411 | B2 | 8/2012 | Baker |
| 8,812,175 | B2 | 8/2014 | Baker |
| 8,823,537 | B2 | 9/2014 | LeFebvre et al. |
| 9,026,281 | B2 | 5/2015 | Murphy et al. |
| 9,365,223 | B2 | 6/2016 | Martin et al. |
| 9,918,673 | B2 | 5/2018 | Martin et al. |
| 2009/0040043 | A1 | 2/2009 | Rohr et al. |
| 2009/0147714 | A1* | 6/2009 | Jain .................. H04W 52/0216 370/311 |
| 2014/0324389 | A1* | 10/2014 | Baldwin ................ G01D 21/00 702/187 |
| 2016/0128168 | A1* | 5/2016 | Walker .................... H05B 47/19 315/77 |
| 2018/0319414 | A1* | 11/2018 | Lefebvre ............. B61L 15/0072 |
| 2019/0126946 | A1* | 5/2019 | Shubs, Jr. ............ B61L 15/0081 |
| 2019/0225248 | A1* | 7/2019 | Lidgett .................... B61D 7/02 |
| 2020/0001906 | A1* | 1/2020 | Bramucci .............. B61L 25/028 |
| 2020/0079343 | A1* | 3/2020 | Martin .................. B60T 17/221 |

FOREIGN PATENT DOCUMENTS

| | | | |
|---|---|---|---|
| KR | 10-1111569 | B1 | 2/2012 |
| KR | 10-1806814 | B1 | 12/2017 |
| WO | 2017-195325 | A1 | 11/2017 |

* cited by examiner

RAILCAR SENSOR COMMUNICATION SYSTEM

RELATED APPLICATION

This application claims priority to U.S. Provisional Application Ser. No. 62/901,423, entitled "RAILCAR SENSOR COMMUNICATION SYSTEM," filed Sep. 17, 2019.

TECHNICAL FIELD OF THE INVENTION

This disclosure relates generally to railcars, and more particularly to a sensor communication system for a railcar.

BACKGROUND

Tank cars and hopper cars are types of railroad cars designed to transport liquid, gaseous, and bulk commodities such as oil, railbit, plastic beads, grain, cement, etc. Tank cars, generally, include a horizontal tank mounted to a flat car. Hopper cars include a bulk container, such as a rectangular bin, mounted to a flat car.

Both kinds of cars may include hatches, gates, and/or valves for loading and unloading a transported commodity. To monitor the railcar before, during, and/or after transit, the railcar may include various sensors to detect hatch/valve status, commodity fill level, moisture content, etc. Other types of railcars may also include various sensors, for example, to monitor a door status (e.g., open/closed), and general sensors such as global positioning system (GPS) and/or battery status sensors.

SUMMARY

As described above, a variety of sensors may be used to monitor various aspects of a railcar. Most, if not all, of the sensors rely on electricity to collect and transmit the monitored data. For a moving railcar, however, electricity may be limited. Accordingly, particular embodiments efficiently manage energy usage of the sensors in a railcar sensor communication system.

According to some embodiments, a railcar monitoring system for monitoring one or more conditions associated with a railcar comprises a railcar controller and one or more sensors disposed throughout the railcar and communicably coupled to the railcar controller. The railcar controller is configured to exchange data with the one or more sensors and transmit data from the one or more sensors to a remote location. An amount of data exchanged between the railcar controller and the one or more sensors is controlled based on a railcar context. The railcar context is based on a location and/or activity associated with the railcar.

In particular embodiments, the railcar context is based on whether the railcar is at one of an origin, a destination, or in-transit and whether the railcar is one of moving or stationary. The railcar context may be based on whether the railcar is loading, unloading, or in-transit.

In particular embodiments, the one or more sensors comprise one of a hatch sensor, gate sensor, accelerometer, temperature sensor, humidity sensor, door sensor, brake sensor, cargo level sensor, load cell, moisture sensor, and off-gassing sensor.

In particular embodiments, the one or more sensors are communicably coupled to the railcar controller via Bluetooth. Data may be exchanged between the railcar controller and each of the one or more sensors at a frequency higher than a reset time of a Bluetooth connection.

In particular embodiments, the railcar controller comprises an Internet-of-Things (IoT) device. The railcar controller may be configured to transmit the data from the one or sensors to the remote location via a message queuing telemetry transport (MQTT) server.

In particular embodiments, the railcar controller is further configured to power off one or more sensors based on the railcar context.

In particular embodiments, the railcar controller is further configured to communicate with a second railcar controller, determine the second railcar controller has a higher available battery power than the railcar controller, and transmit the data from the one or more sensors to the remote location via the second railcar controller.

Certain embodiments of the railcar sensor communicating system may provide one or more technical advantages. For example, particular embodiments may efficiently determine when a sensor transmits/receives data based on railcar contexts, such as an activity context and a location context. Reducing or limiting communications to/from sensors conserves battery life and prolongs sensor operating life.

BRIEF DESCRIPTION OF THE DRAWINGS

For a more complete understanding of the present disclosure, reference is now made to the following description, taken in conjunction with the accompanying drawings, in which.

DETAILED DESCRIPTION

Various types of railcars exist for specialized purposes. For example, particular railcar types include flat cars, box cars, hopper cars, tank cars, well cars, autorack cars, etc.

Hopper cars, for example, generally include one or more hoppers which may hold cargo or lading (e.g., bulk materials) during shipment. Hopper cars frequently transport coal, sand, metal ores, aggregates, grain, plastic pellets, and any other type of lading which may be discharged through openings formed in one or more hoppers.

As another example, tank cars transport bulk liquid commodities, such as oil, ethanol, liquid natural gas, etc. Many tank cars are equipped with a top operating platform that provides a rail operator with access to the top fittings of the tank car, such as various valves, gauges, inlet/outlet connections, manways, and other equipment usually mounted along a top centerline of the tank.

Both kinds of cars may include hatch openings to provide access to the railcar (e.g., for access to the tank, to load product in the hopper, etc.) and a discharge valve or bulk gates at the bottom of the railcar.

Other railcars, such as box cars and autorack cars, may have one or more doors for loading/unloading cargo. In addition, the railcars described above may include common components such as trucks and brakes.

Figure 1:
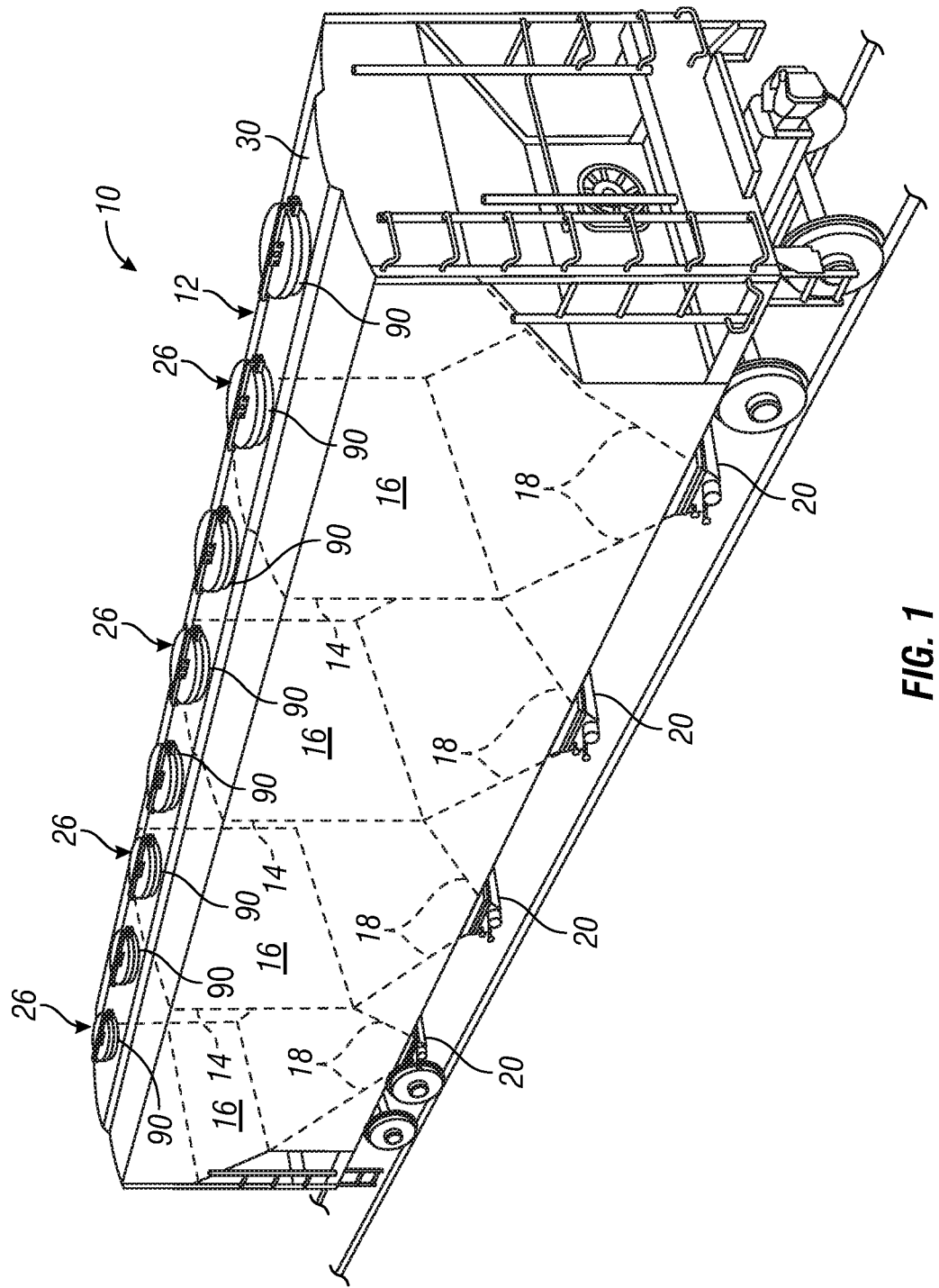
FIG. 1 is a side perspective view of a hopper car.

FIG. 1 is a side perspective view of a hopper car. As illustrated, hopper car 10 has a plurality of hoppers 16. Each hopper has at least one hopper outlet 20. Preferably, each hopper outlet 20 is positioned at a bottom end portion of the hopper 16. More than one hopper outlet may be employed.

The interior of each hopper may be defined by substantially vertical upper sidewall portions and sloped lower sidewall portions. For example, hoppers 16 illustrated in FIG. 1 each have an interior defined by four sidewalls. Each sidewall has a substantially vertical upper sidewall portion 14 and a sloped lower sidewall portion 18. Sloped sidewall portions 18 each slope inwardly from respective lower edges of vertical sidewall portions 14 to respective upper edges of hopper outlet 20.

The configuration of the interior of each hopper assists in the exit of material from the hopper. It should be noted that configurations other than that shown in FIG. 1 may be used to accomplish this objective. For example, greater or fewer than four sidewalls may be used. Also, the interior perimeter of hopper 16 and of first outlet portion 20 may comprise shapes other than a square as shown. For example, the interior may be funnel-shaped.

FIG. 1 also illustrates roof 29 of hopper car 10. Roof 29 includes at least one hatch opening 90. Each hopper 16 has at least one associated hatch 90 located at an upper end thereof in roof 29. Each hopper 16 may have more than one hatch 90. Hatch 90 comprises a hatch opening 91, which is formed in roof 29 above a particular hopper 16. As illustrated, hatch opening 91 has a generally circular shape, but the hatch opening may have other shapes.

Dry, bulk material is generally loaded from a bulk loading facility through the hatches into the respective hopper car. The hatches are then closed, and the hopper car transported to its unloading destination. At the unloading facility the dry, bulk material is then unloaded from the hopper outlet. During both shipment and unloading, it is important to protect the dry, bulk material contained within the hopper car from contamination by external sources.

To protect the contents of the hopper car, the hatches and outlets are generally provided with covers. Each hatch 90 is associated with hatch cover 26. For some applications, hopper car 10 may have four hoppers 16 (as illustrated in FIG. 1) with two or three hatches 90 per hopper 16 formed in roof 29 for use in loading the respective hopper section. FIG. 1 illustrates two hatches 90 for each hopper 16.

Although a hopper car is illustrated as one example, as described above, other railcars include flat cars, box cars, tank cars, well cars, autorack cars, etc.

The above mentioned railcar components, i.e., hoppers, tanks, hatches, gates, valves, gauges, brakes, etc., may be monitored by one or more sensors. A variety of sensors can be used to monitor many aspects of a railcar before, during, and after transportation of products. Sensors that may be used include, but are not limited to: hatch sensors, gate sensors, accelerometers, temperature sensors, humidity sensors, door sensors, brake sensors, cargo level sensors, load cells, moisture sensors, and off-gassing sensors.

Figure 2:
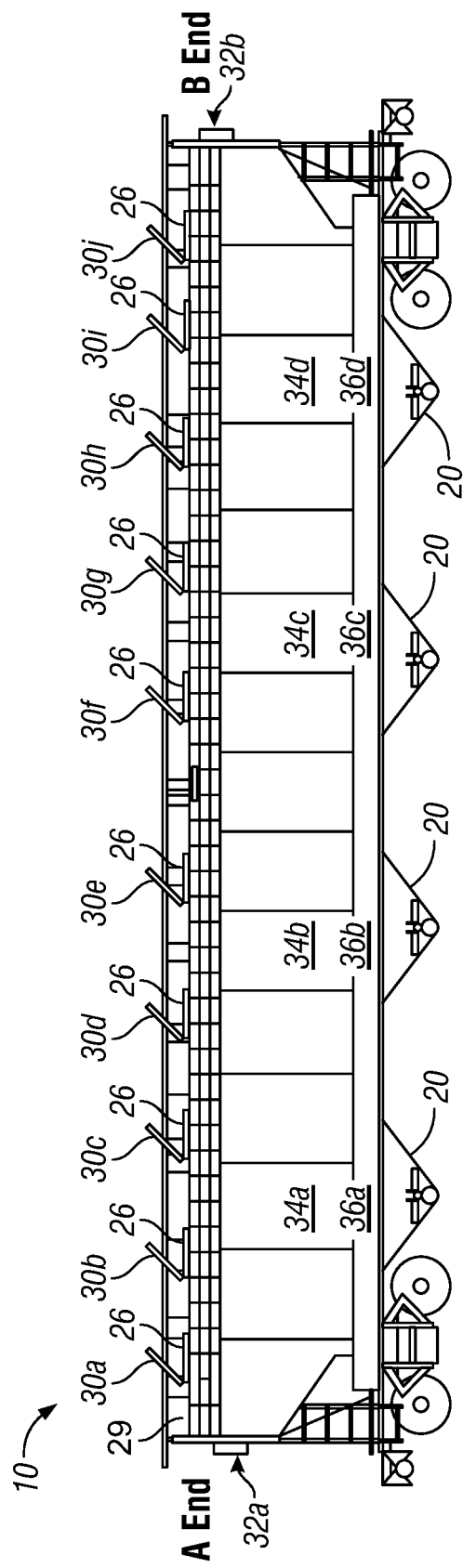
FIG. 2 is a side view of a hopper car with sensors.

FIG. 2 is a side view of a hopper car with sensors. In the illustrated example, hopper car 10 includes hatch sensors 30, accelerometers 32, hopper sensors 34, and gate sensors 36.

Hatch sensors 30 may detect, for example, whether hatch cover 26 is closed, partially open, or open. Hatch sensor 30 may comprise a pressure sensor that determines an amount of pressure applied to hatch cover 26. The amount of pressure determines whether hatch cover 26 is closed, partially open, or open. In some embodiments, hatch sensor 30 may comprise an inclinometer, and the incline of hatch cover 26 determines whether hatch cover 26 is closed, partially open, or open. Some embodiments may use a combination of sensors.

Accelerometers 32 may determine whether hopper car 10 is in motion, stopped, and/or detect a collision based on an abrupt change in acceleration.

Hopper sensor 34 may detect a commodity fill level in hopper 16. For example, hopper sensor 34 may comprise an ultrasonic transducer configured to measure a distance from a reference point near the top of hopper 16 to the top of the commodity within hopper 16. In some embodiments, hopper sensor 34 may comprise a load cell that measures a weight in hopper 16.

Hopper sensor 34 may be used during loading to detect when hopper 16 is full or during unloading to detect when hopper 16 is empty (or any value between full and empty, e.g., half-full, half-empty). Hopper sensor 34 may be used during transit to determine if the commodity is leaking from hopper 16.

Gate sensor 36 may determine whether a gate covering hopper outlet 20 is open, partially open, or closed. Gate sensor 36 may comprise an ultrasonic transducer configured to measure a position of the gate to determine whether the gate is open, partially open, or closed.

Each of sensors 30, 32, 34, and 36 may be coupled to a battery source (not illustrated). Each of sensors 30, 32, 34, and 36 may be communicably coupled to a railcar controller or gateway (not illustrated) for communication with remote monitoring systems.

Hopper car 10 may include additional sensors not illustrated. In addition, other types of railcars may include similar or additional sensors.

A typical train comprises many railcars. The railcars may be of the same or different types. Each of the railcars may have multiple sensors. Furthermore, in addition to the power consumption of each sensor, the sensors are communicably coupled to a communication system that facilitates remotely obtaining the status of any given sensor. Continuous powering and monitoring of each and every sensor may therefore become energy prohibitive in a system that is isolated from a power grid, such as a moving railcar.

Accordingly, particular embodiments described herein efficiently manage energy usage of the sensors in a railcar sensor communication system. Embodiments of the present disclosure and its advantages are best understood by referring to FIGS. 1 through 4 of the drawings, like numerals being used for like and corresponding parts of the various drawings.

It is to be understood the present invention is not limited to particular devices or methods, which may vary. It is also to be understood that the terminology used herein is for the purpose of describing particular embodiments only and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Many trains include a global positioning system (GPS) and a data transmitter. The positioning system enables the position of the train to be determined and transmitted to a remote location. The positioning system enables the transportation operators, shippers, and railcar owners to know the location of the train and the associated railcars at all times.

In some embodiments, sensors disposed throughout the railcars may also be coupled to the positioning system. Data obtained from any of the sensors can then be transmitted through the positioning system to the transportation operators or the railcar owners to enable the status of any of the railcars to be monitored in real time.

Given the number of sensors that can be disposed throughout a train, such a load of information may tax the positioning system in terms of storage and battery capability. In some embodiments, a railcar monitoring system may operate various components of a railcar and collect and transmit data from various sensors disposed throughout the railcar. The railcar monitoring system may include a railcar controller, one or more sensors disposed throughout the railcar, a data collection network, and data transmission equipment. In particular embodiments, each railcar associated with a train of railcars includes a railcar monitoring system.

The railcar controller is coupled to the one or more sensors, the data collection network, and the data transmission equipment. The railcar controller includes a processor that executes non-transitory program instructions, wherein the non-transitory program instructions cause the processor to provide control signals through the data collection network to the sensors and the data transmission system. Such control signals can be used to turn sensors on or off, initiate data collection from the sensors, and transmit collected data to a remote location repository.

A repository includes a data storage device for collecting data and allowing access to the data by designated parties. A repository may be configured in a cloud architecture.

Associated with the railcar monitoring system are one or more data nodes. In particular embodiments, a data node may be part of the railcar controller. In some embodiments, data nodes may be part of a sensor. Some of the functions of a data node include but are not limited to: aggregation of incoming sensor data for ease of communication to the gateway to the repository; performing edge computing for filtering to reduce cell traffic from the gateway to the cloud; turn on and off sensors as appropriate for battery saving; receive, store and distribute over the air (OTA) updates; and set the local time standards for communications from the sensors to further reduce battery consumption.

The railcar monitoring system may also include data transmission equipment to facilitate transmission of data collected by the railcar controller to a remote location. In some embodiments, the data transmission equipment is provided with an agnostic cell phone connection using fourth generation (4G) long term evolution (LTE) Cat-M or narrowband Internet-of-Things (NB-IoT). 4G LTE Cat-M is designed for short, error free, powerful messaging for over the air updates. 4G LTE is also a universal communications protocol that facilitates communication with most, if not all, cellular network carriers. Some embodiments may use fifth generation (5G) communications.

To ensure accurate alerting as to when the various sensors should be turned on and off, a GPS may be built into the railcar controller to provide the current location of the railcar. Placing a GPS in the railcar controller may reduce the power and data usage of the existing onboard GPS. Providing a GPS in each railcar also enables the railcar owner to monitor the location of the railcar, and the associated load, at all times without need for inquires to the train operators.

In some embodiments, the railcar controller includes a data collection network that provides an internal network throughout the railcar that links most, if not all, sensors to the railcar controller. A data collection network includes one or more data nodes, each data node coupled to one or more sensors disposed in one or more railcars. The data nodes and/or the sensors may include a transmitter/receiver pair, or a transceiver, to allow bi-directional communications within the train data collection network. Bi-directional communications are used, in some embodiments, to toggle a sensor on/off. The bi-directional communications network may be used to toggle sensors on or off according to the location of the train and/or train events (e.g., train stops, hatch breech, gate breech, etc.). Having the ability to turn sensors off when not needed reduces the power consumption by the sensor.

The 802.15.4 communication standard used by many current train GPS systems is, generally, not capable of handling the amount of data collection and power needed if multiple sensors are being monitored by the data collection network. 802.15.4 is not powerful enough, and consumes too much power, to provide adequate battery resources for all of the sensors that are often used.

In some embodiments, the Bluetooth protocol is used for data collection from the various sensors. The Bluetooth protocol overcomes many of these problems associated with the 802.15.4 communication standard. Bluetooth 5.1 allows higher transmit power (up to 20 dBm vs 8 dBm for 802.15.4), longer range and greater penetration, enhanced error correction, location-based paring, and mesh networking.

One advantage of using a Bluetooth communications protocol is that the power consumption for the data collection network can be minimized. In one embodiment, the railcar controller sends control signals to each of the sensors (or data nodes associated with a sensor) periodically to collect information from each of the sensors. For example, the railcar controller may send signals every 30 seconds, every minute, every two minutes or every 5 minutes. The time period for sending sensor inquiries may be based on the Bluetooth connection reset time.

Under the Bluetooth protocol, if a predetermined time has elapsed, the Bluetooth connection is disabled (this is the "reset time"). The connection will then need to be reestablished before Bluetooth communications can be resumed. The reestablishment of a Bluetooth connection takes time and requires additional power each time the connection process is run. Accordingly, in some railcar configurations, it is more energy efficient to keep a Bluetooth connection on at all times, rather than only connecting the devices when data is needed. One way to force the Bluetooth system to remain on at all times is to transmit data or control signals over each Bluetooth connection to reset the time-out timer on the connection.

In some embodiments, the data node includes a processor to allow edge computing of the incoming sensor data. As used herein, the phrase "edge computing" refers to the practice of processing data in the device, or a separate processor, at the location that the data is being generated. "Edge computing" minimizes the use of a centralized data-processing center, and thus minimizes the amount of data transferred over the network. In addition, the data node processor may use fuzzy logic to enable the processor to "learn" the typical operating and usage patterns associated with the equipment and events for the specific train associated with the railcar system controller. Typical events associated with train sensors include, but are not limited to, opening/closing of the hatch, level or weight of material in a hopper or tank, opening/closing of the gate, movement/stoppage of the trains, etc.

The data transmission network may be used to receive and/or store OTA updates. The OTA updates may be distributed to data nodes or sensors over the data collection network.

The data collection network may also enable location-based pairing of the sensors with the railcar system controller. The data collection network, in some embodiments, creates a meshed network that enables the external communication requirements to be distributed among the individual railcar monitoring systems.

For example, in one embodiment a plurality of railcars associated with a train may each include a railcar system controller. Rather than each railcar monitoring system transmit data to a remote location, external data communication for all of the railcar monitoring systems may be sent through a single selected railcar monitoring system data transmission system. In this way, the power consumption associated with external communication may be distributed among the railcar monitoring systems. For example, in one control scheme, when an external transmission is scheduled, the railcar monitoring systems may, collectively, find the railcar monitoring system with the highest available power and route the communications through that particular system.

In addition to sensors, the railcar monitoring system may also include smart devices that can be used to remotely operate various components in the railcars. For example, hatches and gates may be coupled to a remote operating apparatus that allows the hatches and gates to be remotely opened and/or closed. The remote operating apparatus may be coupled (through a wired or wireless connection) to the railcar monitoring system. Control signals may be sent through the data collection network of the railcar monitoring system to operate the railcar components.

In one embodiment, the railcar monitoring system may operate railcar components without human intervention using artificial intelligence. For example, if the artificial intelligence knows the location of the railcar and determines that it is an appropriate location, the railcar monitoring system may decide to open gates to unload the railcar, thus reducing required human intervention.

In some embodiments, the railcar controller may comprise an IoT device. An example of a railcar sensor communication system in operation is illustrated in FIGS. 3 and 4.

Figure 3:
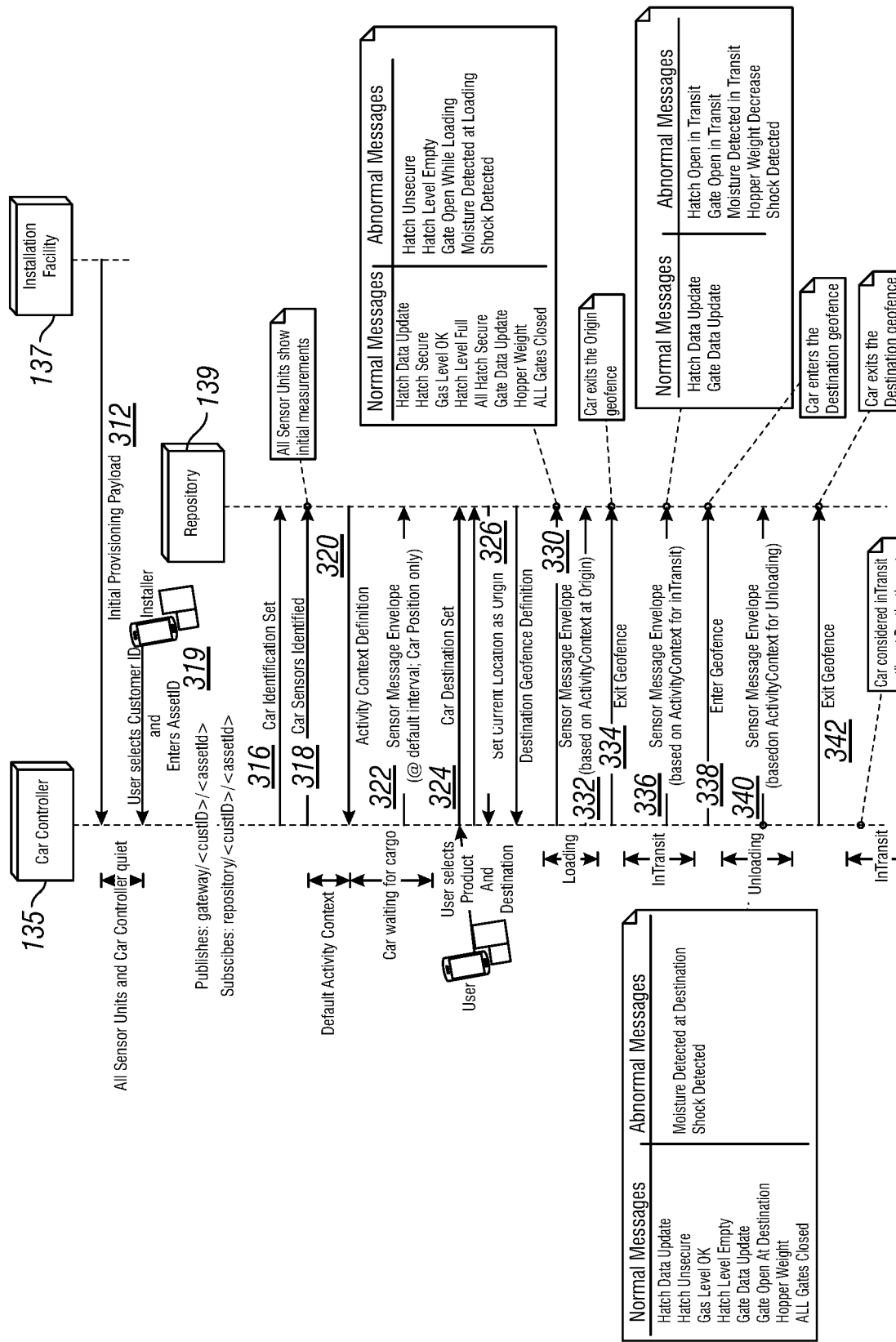
FIG. 3 is a flowchart describing an example method for use with a railcar sensor communication system.

FIG. 3 is a flowchart describing an example method for use with a railcar sensor communication system. FIG. 4 is a block diagram illustrating a railcar sensor communication system in an IoT system.

Figure 4:
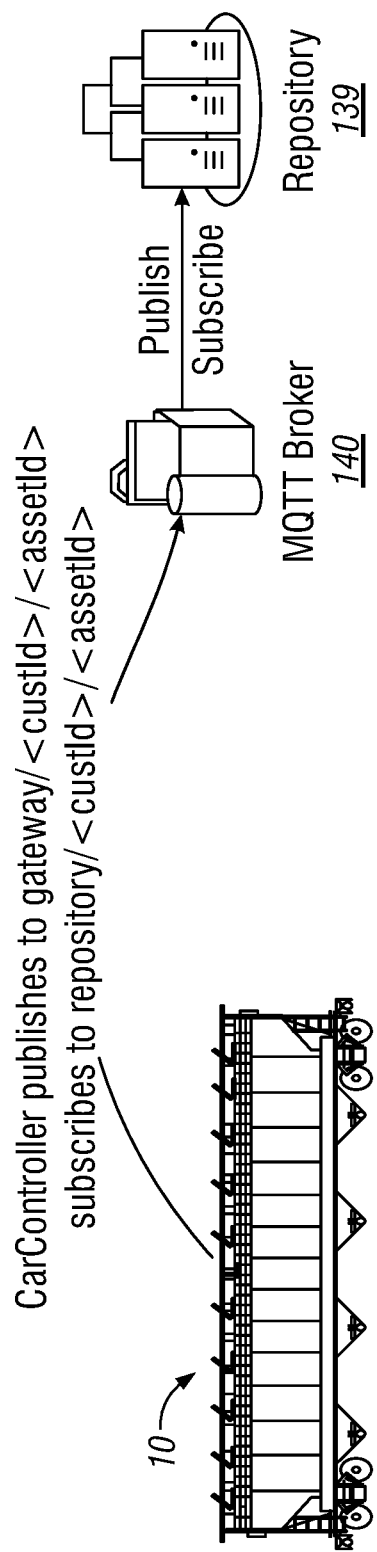
FIG. 4 is a block diagram illustrating a railcar sensor communication system in an IoT system.

As illustrated in FIG. 4, hopper car 10 may comprise one or more sensors and a railcar controller in communication with repository 139 via message queuing telemetry transport (MQTT) broker/server 140. MQTT is a lightweight publish/subscribe messaging protocol designed for machine to machine (M2M) telemetry in low bandwidth environments. MQTT may be used for IoT deployments.

The railcar sensors may comprise Bluetooth low energy devices in communication with the railcar controller. The railcar controller may be defined as a Generic Attribute Profile (GATT) service with two characteristics, one for input and one for output. The input is writable, and the output is readable and notifiable.

Different message types facilitate different types of communication between the railcar controller and the sensor units. The railcar message may use request messages to request certain readings from the railcar sensors on demand. The railcar controller uses control messages to set configurable parameters per railcar sensor, such as how often a periodic reading is sent or if a sensor is to be enabled or disabled. Data messages are sent from the railcar sensors to the railcar controller either periodically or as a result of a request message. Error messages are sent from the railcar sensors to the railcar controller as needed. The error messages may inform the repository about issues with devices in the field and may act as indicators for firmware upgrades.

In general, after the railcar controller and sensors are installed and provisioned, at the origin of a trip, the railcar is identified with its transport product and destination, and the loading process may be monitored. During transit the railcar is monitored. At the destination, the unloading process is monitored. An example is illustrated in FIG. 3.

Returning to FIG. 3, at step 312 the railcar receives its sensors and railcar controller at installation facility 137. The initial processing payload may include universally unique identifiers (UUID) for the sensors and railcar controller, and information about how to communicate with repository 139 such MQTT broker identifier and credentials. The sensors may be paired with railcar controller 135. At this time, however, the sensors and railcar controller 135 are quiet. The sensors are not transmitting, and railcar controller 135 is not communicating with the repository.

Before the railcar is used for a shipment, at step 314, an installer enters a customer identifier and an asset identifier for the railcar. Based on the customer identifier and asset identifier, railcar controller 135 defines its topics for sending and receiving messages. The topic is a "routing" key for the message contents. For example, messages may be published to the "gateway" (/gateway/<custId>/<assetId>) topic and received through the "repository" (/repository/<custId>/<assetId>) topic.

At this time railcar controller 135 is able to communicate with repository 139. At step 316 railcar controller 135 notifies repository 139 that its identification is set and at step 318 sends an identification of the railcar sensors paired with railcar controller 135. The notification may include initial readings for each of the railcar sensors.

At step 320, repository 139 responds to railcar controller 135 with a default activity context. An activity context sets an interval for railcar controller 135 to read its sensors. For example, some embodiments may include four activity contexts: quiescent (no readings), crawl (12 hours), slow (1 hour), medium (10 minutes), and fast (1 minute). The default activity context may be quiescent.

In some embodiments, the activity context may be established by a sensor based on local observations. In some embodiments, each sensor may have its own activity context.

As the railcar is waiting for cargo, at step 322, railcar controller 135 may periodically send events to repository 139. For example, railcar controller 135 may send a railcar position event to repository 139.

At the trip origin, a user may input (using a handheld wireless device, for example) the product to be transported and the destination. At step 324, railcar controller 135 sends the product and destination information to repository 139. At step 326, railcar controller 135 may set its origin information based on its current location.

At step 329, repository 139 may send destination geofence information to railcar controller 135. Railcar controller 135 may use the geofence information to determine when the railcar is at or near its destination.

During loading, at steps 330 and 332 railcar controller 135 sends event messages to repository 139. Event messages are created by railcar controller 135 and sent to repository 139. Events occur based on the context of the railcar and sensor readings or combination of sensor readings.

The context of the railcar has two components: a LocationContext and an ActivityContext. The ActivityContext is described above with respect to step 320. The LocationContext is based on railcar movement and the geographical location of the railcar. For example, LocationContext may include the following contexts: "unknown," "Moving-In Transit," "Stationary-In Transit," "Moving-At Destination," "Stationary-At Destination," "Moving-At Origin," and "Stationary-At Origin." The contexts may be used by railcar controller 135, for example, to instruct individual sensors how often to report data.

An event message may include a header that includes the customer identifier, asset identifier, UUID of the railcar controller and telemetry information for the railcar. The telemetry information may include battery voltage for the railcar controller, wireless network information such as reference signal receive power (RSRP), carrier, and frequency band, position information such as latitude, longitude, speed, and heading, and a time stamp.

An event message may also include one or more sensor specific messages. Each sensor message may include the sensor type (e.g., hatch, gate, etc.), a UUID of the sensor, a location of the sensor, event that caused the measurement to be taken, Bluetooth signal strength, battery voltage for sensor, and one or more measurement values.

Example events include Hatch Data Update, Hatch Open in Transit, Hatch Secure, Hatch Unsecure, Hatch Level Full, Hatch Level Empty, ALL Hatch Secure, Gas Level OK, Gate Data Update, Gate Open In Transit, Moisture Detected In Transit, Gate Open While Loading, Gate Open At Destination, Moisture Detected at Destination, Moisture Detected at Loading, Hopper Weight, Hopper Weight Decrease, ALL Gates Closed, Shock Detected, Exit Geofence, and Enter Geofence.

Example measurement types include temperature, humidity, barometric pressure, gas concentration, distance, hatch status, hatch change count, water presence, weight, gate status, gate change count, battery voltage, and acceleration signature.

Although the illustrated example includes steps 330 and 332, any suitable number of messages may be sent during the loading process. Examples of normal messages that may be sent during the loading process include Hatch Data Update, Hatch Secure, Hatch Level Full, ALL Hatch Secure, Gas Level OK, Gate Data Update, Hopper Weight, and ALL Gates Closed.

Examples of abnormal messages that may be sent during the loading process include Hatch Unsecure, Hatch Level Empty, Gate Open While Loading, Moisture Detected at Loading, and Shock Detected.

Upon leaving the origin, at step 334 railcar controller 135 sends an Exit Geofence message to repository 139. The LocationContext may be updated to "Moving-In Transit."

At step 336, railcar controller 135 may send one or more events to repository 139. An example of normal message during transit are Hatch Data Update and Gate Data Update. An example of abnormal messages during transit are Hatch Open in Transit, Gate Open in Transit, Moisture Detected in Transit, Hopper Weight Decrease, and Shock Detected.

At step 338, railcar controller 135 determines that it has arrived at or near its destination and sends the Enter Geofence event to repository 139. The LocationContext may be changed to "Moving-At Destination" or "Stationary-At Destination."

During unloading, at step 340, railcar controller 135 may send one or more events to repository 139. Examples of normal messages during unloading are Hatch Data Update, Hatch Unsecure, Hatch Level Empty, Gas Level OK, Gate Data Update, Hopper Weight, and ALL Gates Closed. Examples of abnormal messages during unloading are Moisture Detected at Destination and Shock Detected.

After unloading, the railcar may leave the destination. At step 340, railcar controller 135 sends an Exit Geofence event to repository 139. The railcar may be considered "In Transit" until the next destination for the next trip is provisioned.

As described above, the number of sensors disposed throughout a railcar and the number messages transmitted and received may tax the railcar monitoring system in terms of storage and battery capability. By using the LocationContext and ActivityContext, the railcar monitoring system may conserve battery life, at both the sensors and the railcar controller, by limiting measurements and messages during some combinations of LocationContext and ActivityContext.

Figure 5:
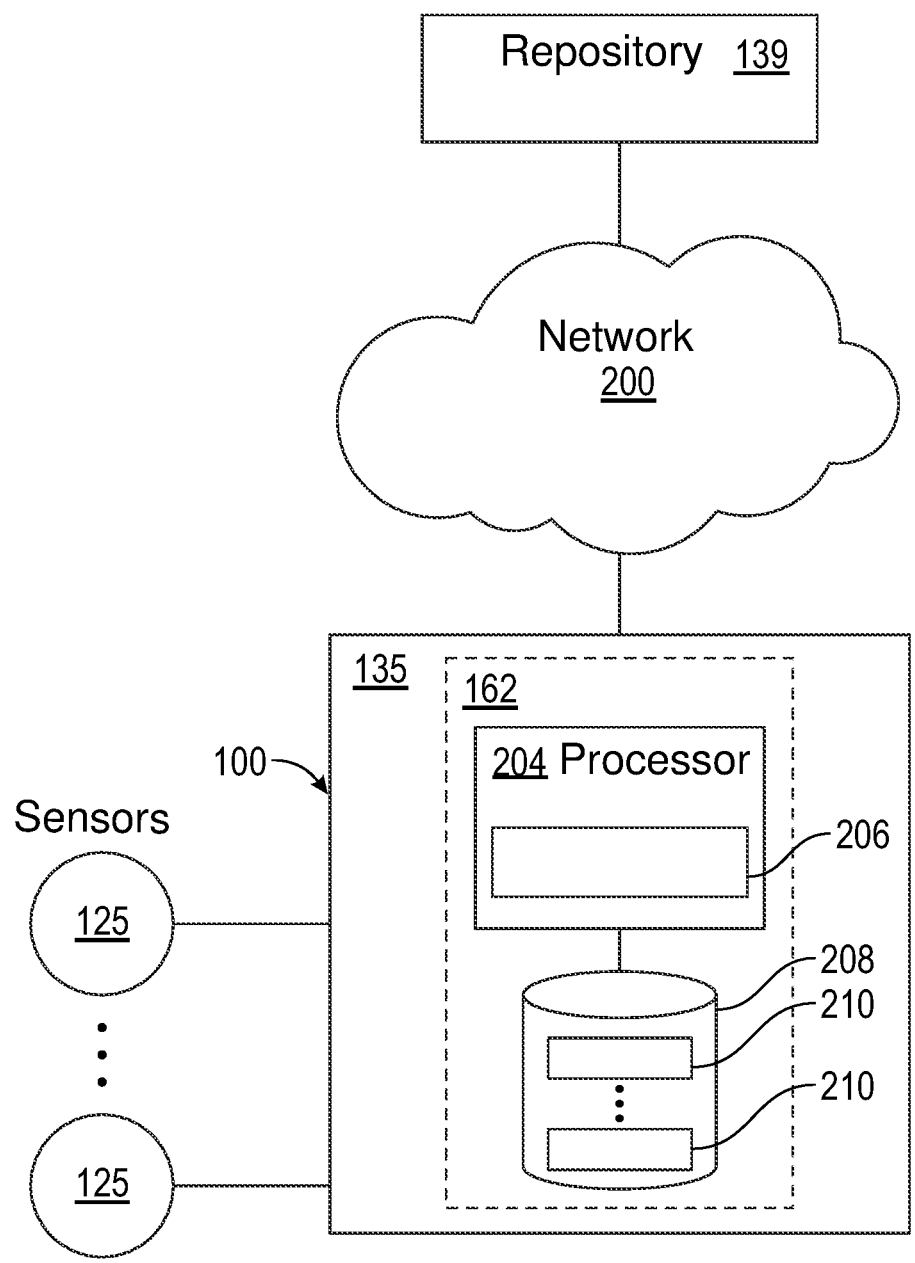
FIG. 5 is a block diagram illustrating components of a railcar sensor communication system, according to particular embodiments.

FIG. 5 is a block diagram illustrating components of a railcar sensor communication system, according to particular embodiments. Railcar controller 135 is communicably coupled to one or more sensors 125 (e.g., sensors 30, 32, 34, and 36 described with respect to FIG. 2). The coupling may be wired or wireless. In some embodiments sensors 125 are wirelessly coupled to railcar controller 135 via Bluetooth. Railcar controller 135 exchanges measurements and/or commands with sensors 125 according to any of the embodiments and examples described above. Railcar controller 135 is communicably coupled to repository 139 via network 200.

Railcar controller 135 comprises processing circuitry 162. Processing circuitry 162 comprises memory 208 operable to store measurements 210 and instructions 206, and one or more processors 204 coupled to memory 208. One or more processors 204 may be implemented as one or more central processing unit (CPU) chips, logic units, cores (e.g., a multi-core processor), field-programmable gate array (FPGAs), application specific integrated circuits (ASICs), or digital signal processors (DSPs). The one or more processors are configured to implement various instructions 206 to monitor and control sensors 125 and communicate with repository 139, and may be implemented in hardware and/or software.

Memory 208 comprises one or more disks, tape drives, or solid-state drives, and may be used as an over-flow data storage device, to store programs when such programs are selected for execution, and to store instructions and data that are read during program execution, such as instructions and logic rules. Memory 208 may be volatile or non-volatile and may comprise read only memory (ROM), random access memory (RAM), ternary content-addressable memory (TCAM), dynamic RAM (DRAM), and/or static RAM (SRAM). Memory 208 may comprise cloud storage. Memory 208 is operable to store, for example, measurements and configuration 210.

In some embodiments, railcar controller 135 comprises wireless communication circuitry for communication over a wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards, including Internet-of-Things (IoT), vehicle to vehicle communication (V2V), etc.; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 200 comprises a plurality of network nodes configured to communicate data between railcar controller 135 and repository 139. Examples of network nodes include, but are not limited to, routers, switches, modems, web clients, and web servers. Network 200 comprises any suitable type of wireless and/or wired network including, but not limited to, all or a portion of the Internet, the public switched telephone network, a cellular network, and/or a satellite network. Network 200 is configured to support any suitable communication protocols as would be appreciated by one of ordinary skill in the art upon viewing this disclosure.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

The invention claimed is:

1. A railcar monitoring system for monitoring one or more conditions associated with a railcar, comprising:
a railcar controller and one or more sensors disposed throughout the railcar and communicably coupled to the railcar controller;
the railcar controller configured to:
exchange data with the one or more sensors, wherein the one or more sensors are communicably coupled to the railcar controller via Bluetooth and wherein the data is exchanged between the railcar controller and each of the one or more sensors at a frequency higher than a reset time of a Bluetooth connection;
transmit the data from the one or more sensors to a remote location; and
wherein an amount of the data exchanged between the railcar controller and the one or more sensors is controlled based on a railcar context, and wherein the railcar context is based on a location associated with the railcar, and wherein the railcar controller is further configured to power on or off the one or more sensors based on the railcar context.

2. The railcar monitoring system of claim 1, wherein the railcar context is based on whether the railcar is at one of an origin, a destination, or in-transit and whether the railcar is one of moving or stationary.

3. The railcar monitoring system of claim 1, wherein the railcar context is further based on an activity associated with the railcar.

4. The railcar monitoring system of claim 3, wherein the railcar context is based on whether the railcar is loading, unloading, or in-transit.

5. The railcar monitoring system of claim 1, wherein the one or more sensors comprise one of a hatch sensor, gate sensor, accelerometer, temperature sensor, humidity sensor, door sensor, brake sensor, cargo level sensor, load cell, moisture sensor, and off-gassing sensor.

6. The railcar monitoring system of claim 1, wherein the railcar controller comprises an Internet-of-Things (IoT) device.

7. The railcar monitoring system of claim 1, wherein the railcar controller is configured to transmit the data from the one or more sensors to the remote location via a message queuing telemetry transport (MQTT) server.

8. The railcar monitoring system of claim 1, wherein the railcar controller is further configured to:
communicate with a second railcar controller;
determine the second railcar controller has a higher available battery power than the railcar controller; and
transmit the data from the one or more sensors to the remote location via the second railcar controller.

9. A railcar controller for monitoring one or more conditions associated with a railcar, the railcar controller comprising a memory comprising instructions coupled to a processor, wherein the railcar controller, when executing the instructions at the processor, is configured to:
exchange data with one or more sensors disposed throughout the railcar, wherein the one or more sensors are communicably coupled to the railcar controller via Bluetooth and wherein the data is exchanged between the railcar controller and each of the one or more sensors at a frequency higher than a reset time of a Bluetooth connection;
transmit the data from the one or more sensors to a remote location; and
wherein an amount of the data exchanged between the railcar controller and the one or more sensors is controlled based on a railcar context, and wherein the railcar context is based on a location associated with the railcar, and wherein the railcar controller is further configured to power on or off the one or more sensors based on the railcar context.

10. The railcar controller of claim 9, wherein the railcar context is based on whether the railcar is at one of an origin, a destination, or in-transit and whether the railcar is one of moving or stationary.

11. The railcar controller of claim 9, wherein the railcar context is further based on an activity associated with the railcar.

12. The railcar controller of claim 11, wherein the railcar context is based on whether the railcar is loading, unloading, or in-transit.

13. The railcar controller of claim 9, wherein the one or more sensors comprise one of a hatch sensor, gate sensor, accelerometer, temperature sensor, humidity sensor, door sensor, brake sensor, cargo level sensor, load cell, moisture sensor, and off-gassing sensor.

14. The railcar controller of claim 9, wherein the railcar controller comprises an Internet-of-Things (IoT) device.

15. The railcar controller of claim 9, wherein the railcar controller is further configured to:
communicate with a second railcar controller;
determine the second railcar controller has a higher available battery power than the railcar controller; and
transmit the data from the one or more sensors to the remote location via the second railcar controller.

* * * * *